UNITED STATES PATENT OFFICE.

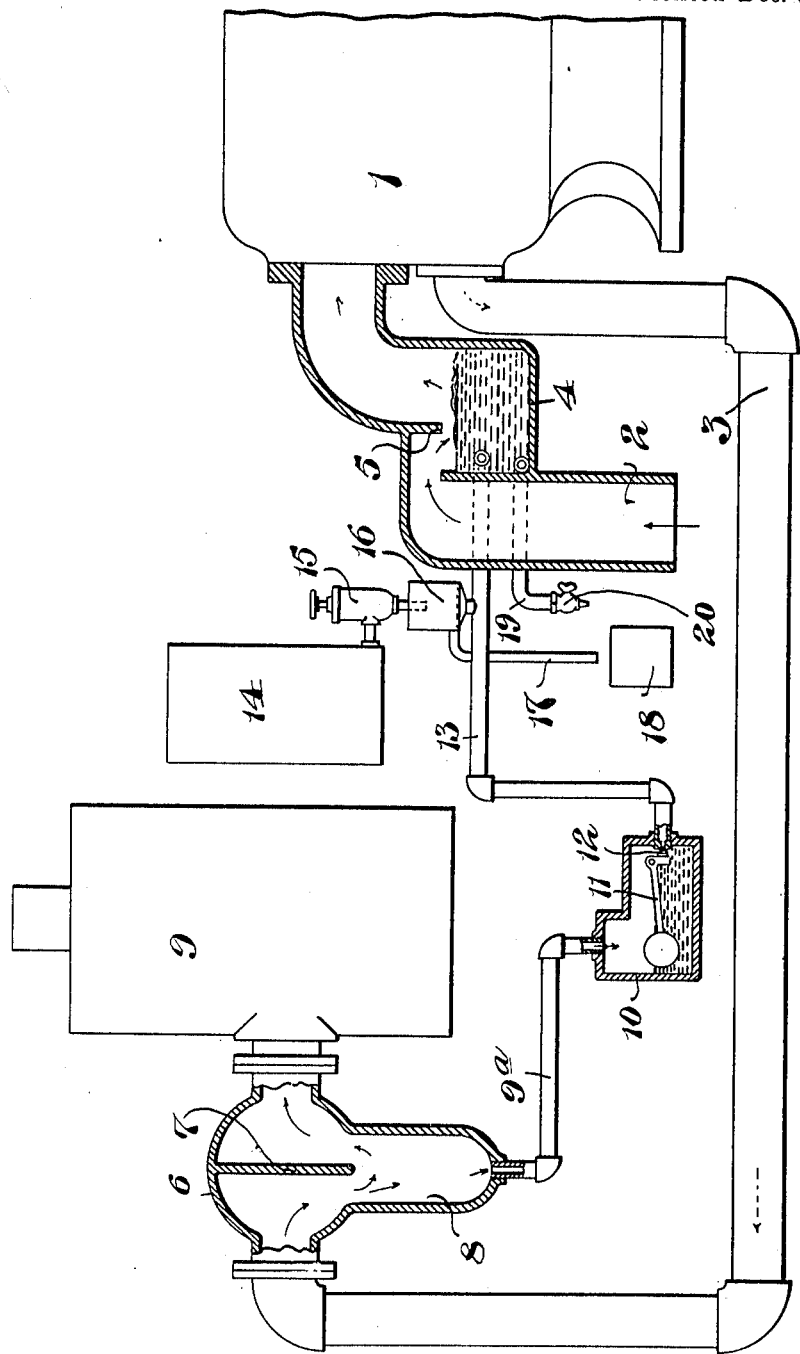
W. H. WINEMAN.
LUBRICATING SYSTEM.
APPLICATION FILED NOV. 22, 1916.
1,326,886.
Patented Dec. 30, 1919.
Inventor:
Wade H. Wineman
by
Atty.

WADE H. WINEMAN, OF CHICAGO, ILLINOIS, ASSIGNOR TO SULLIVAN MACHINERY COMPANY, A CORPORATION OF MASSACHUSETTS.

LUBRICATING SYSTEM.

1,326,886.   Specification of Letters Patent.   Patented Dec. 30, 1919.

Application filed November 22, 1916. Serial No. 132,907.

*To all whom it may concern:*

Be it known that I, WADE H. WINEMAN, a citizen of the United States, residing at Chicago, in the county of Cook and State of Illinois, have invented certain new and useful Improvements in Lubricating Systems, of which the following is a full, clear, and exact specification.

My invention relates to lubricating systems.

It has for its object to provide an improved lubricating system whereby a sufficient supply of lubricant is always maintained upon the working parts of the device to be lubricated to prevent carbonization and the consequent wear of the working parts. A further object of my invention is to provide an improved system of lubrication whereby the lubricant in a suitable reservoir is mixed with a fluid passing through the device to be lubricated, and is subsequently separated from that fluid and returned to its reservoir, so that the same supply of lubricant may be used successively. A still further object of my invention is to provide improved means whereby when a continuous flow of the same lubricant is maintained through the device to be lubricated, the supply of lubricant may be maintained constant despite losses thereof due to vaporization or the like. These and other objects of my invention will, however, hereinafter more fully appear.

In the accompanying drawing, I have illustrated diagrammatically one form which my lubricating system may assume in practice, illustrating the same as applied to a compressor, although it will be understood that the same is not necessarily limited to use in connection with a device of that character.

In this illustrative embodiment of my invention, I have shown a compressor 1, which may be of any standard construction, receiving air from an inlet 2 and discharging air to a discharge pipe 3. Between the inlet 2 and the compressor, it will be noted, however, that I have provided a reservoir 4, preferably disposed beneath a baffle 5, and adapted to contain the lubricant, the level of the latter preferably extending below the lower edge of the baffle, as indicated, so that the air passing to the compressor 1 through the inlet 2 must of necessity pass beneath this baffle and over the surface of the lubricant in such a manner as to riffle the latter and thereby absorb a certain lubricant content. Since the air reaches all of the active or working parts of a compressor, including the cylinder, the piston, and the valves, lubricant will thus be supplied with the air to all of those parts in such quantity as to maintain a film of lubricant thereon and thus prevent carbonization.

Obviously, since the lubricant has been supplied to the compressor with the air entering the latter, it will also be discharged with the air through the pipe 3. In my improved construction, however, I have provided separating means which act to separate the lubricant from the discharged air. This separator may, obviously, assume various forms, the same being illustrated herein at 6 in such a manner only as to bring out its principle of operation. In the illustrative construction, it will be noted that a vertically disposed baffle plate 7 is provided substantially midway of the separator and in the path of the incoming mixture of air and lubricant, so that when this mixture strikes the baffle, it will be forced to pass around the lower end of the same in such a manner that, through the centrifugal action and the action of gravity, the lubricant will be separated from the air and, with the water of condensation, pass down into a chamber 8 at the bottom of the separator, while the air will pass out on the opposite side of the baffle plate into a suitable receiver 9.

From this chamber 8, the lubricant and the water of condensation pass out through a pipe 9ª to a trap 10 of usual construction including a pivoted float 11 controlling a valve 12 which, in turn, controls the flow of a predetermined excess of the lubricant and the water of condensation from the trap through a pipe 13 leading to the reservoir 4. Obviously, when the level of the mixture in the trap 10 is below a predetermined point, the float operated valve 12 will remain closed, and when the level in the trap exceeds that level, the valve 12 will be opened, so that the pressure in the discharge pipe 3, or the receiver pressure, will force the excess mixture out through the pipe 13 and over to the reservoir 4, wherein it will be obvious that, due to the specific gravity of the liquids, the oil will float on the top of the water and above the heavy dotted line shown while the water will be disposed below that line, as illustrated.

If desired to compensate for any losses of lubricant arising from vaporization or the like, I may, as indicated, also arrange to supply lubricant from a suitable supplemental reservoir 14 through a drip cup 15 into a constant level cup 16 communicatng with the pipe 13 and having an overflow 17 delivering into a suitable receptacle 18. It will also be evident that in order to maintain the desired constant level in the reservoir 4 and prevent interference with the proper lubrication of the machine, due to an excess of water of condensation, I may provide a suitable pipe 19 connected with the lower part of the reservoir 4 and controlled by a suitable cock 20.

In the use of my improved system, it will be noted that the lubricant is first vaporized by the action of the air rushing from the intake into the compressor, this air riffling the surface of the lubricant in the reservoir 4 and thereby causing an intimate mixture to be made which may readily be carried by the air to all of the working parts of the compressor. It will also be noted that, through the use of a separator, the lubricant content of this mixture emerging from the compressor is separated therefrom automatically, the air being transmitted to the receiver, while the lubricant is returned to its reservoir. Attention is also directed to the fact that, through the provision of the trap and valve mechanism therein, the lubricant is transmitted from the separator to its reservoir whenever the level in the trap exceeds a predetermined point. By the use of my improved supplemental means for maintaining a predetermined level in the lubricant reservoir located in the inlet, it will also be noted that a constant supply of lubricant may be mixed with the incoming air and that all losses of lubricant either in the machine or arising from vaporization, may be compensated for without interrupting the operation of the system. These and other advantages of my improved construction will, however, be clearly apparent to those skilled in the art.

While I have in this application specifically described one embodiment which my invention may assume in practice, it is to be understood that the same may be modified and embodied in various other forms without departing from the spirit of the invention, and that it is my intention to include all such modifications within the scope of the appended claims.

What I claim as new and desire to secure by Letters Patent is:—

1. In a lubricating system, a device to be lubricated, fluid supply means therefor, and a lubricant reservoir disposed in said supply means having means for directing the fluid against the surface of the lubricant in the reservoir.

2. In a lubricating system, a device to be lubricated, fluid supply means therefor, and a lubricant reservoir disposed in said supply means having a baffle extending to a point adjacent the surface of the lubricant therein.

3. In a lubricating system, a device to be lubricated, fluid supply means therefor and a lubricant reservoir open at the top and disposed in said supply means and having means for diverting fluid against the surface of the lubricant.

4. In a lubricating system, a device to be lubricated, fluid supply means therefor, a lubricant reservoir disposed in said supply means having means for directing the fluid against the surface of the lubricant, and means for subsequently separating the lubricant and returning the same to said reservoir.

5. In a lubricating system, a device to be lubricated, fluid supply means therefor, a lubricant reservoir disposed in said supply means having a baffle extending to a point adjacent the surface of the lubricant therein, and means for subsequently separating the lubricant and returning the same to said reservoir.

6. In a lubricating system, a device to be lubricated, a lubricant reservoir, means for forming therein an intimate mixture of the lubricant with a moving fluid and passing the mixture through said device, and means for subsequently separating the lubricant and returning the same to said reservoir.

7. In a lubricating system, a compressor having an inlet, a lubricant reservoir disposed in said inlet, a discharge line connected to said compressor, a separator in said discharge line, and means for returning the lubricant separated by said separator to said reservoir.

8. In a lubricating system, a compressor having an inlet including a baffle, a lubricant reservoir disposed beneath said baffle, a discharge main connected to said compressor, a separator connected in said discharge main, and means for returning to said reservoir the lubricant separated by said separator.

9. In a lubricating system, a compressor having an inlet including a baffle, a lubricant reservoir disposed beneath said baffle, a discharge main connected to said compressor, a separator connected in said discharge main, a receiver connected to said separator, and means connected to said separator for returning to said reservoir the lubricant separated by said separator.

10. In a lubricating system for compressors, a compressor having an inlet, means in said inlet for mixing lubricant with the fluid entering through said inlet, a discharge pipe connected to said compressor, means connected to said discharge pipe for separating the lubricant from the fluid discharged from said compressor, and means for returning the lubricant to said inlet.

11. In a lubricating system for compressors, a compressor having an inlet, means utilizing a flow of fluid for mixing lubricant with the fluid entering through said inlet, a discharge pipe connected to said compressor, means connected to said discharge pipe for separating the lubricant from the fluid discharged from said compressor, and means for returning the lubricant to said inlet.

12. In a lubricating system for compressors, a compressor having an inlet, means including a reservoir for mixing lubricant with the fluid entering through said inlet, a discharge pipe connected to said compressor, means connected to said discharge pipe for separating the lubricant from the fluid discharged from said compressor, and means for returning the lubricant to said reservoir.

13. In a lubricating system for compressors, a compressor having an inlet, a lubricating reservoir disposed in said inlet, a receiver, a discharge line connected to said compressor and receiver, a separator in said discharge line between said compressor and receiver, and means for returning lubricant separated by said separator to said reservoir.

14. In a lubricating system for compressors, a compressor having an inlet, means for mixing lubricant with the fluid entering through said inlet, a discharge pipe connected to said compressor, means connected to said discharge pipe for separating the lubricant from the fluid discharged from said compressor, means for returning the lubricant to said intake, and means for maintaining a predetermined supply of lubricant to said inlet.

15. In a lubricating system for compressors, a compressor having an inlet, a baffle in said inlet, a lubricant reservoir disposed beneath said baffle, a discharge pipe connected to said compressor, means for separating from the fluid flowing therethrough the lubricant and water of condensation, and means for returning the former to said reservoir.

16. In a lubricating system for compressors, a compressor having an inlet, a baffle in said inlet, a lubricant reservoir disposed beneath said baffle, a discharge pipe connected to said compressor, means for separating from the fluid flowing therethrough the lubricant and water of condensation and returning the same to said reservoir, and means for varying the proportion of the lubricant in said reservoir.

17. In a lubricating system for compressors, a compressor having an inlet, a baffle in said inlet, a lubricant reservoir disposed beneath said baffle, a discharge pipe connected to said compressor, means for separating from the fluid flowing therethrough the lubricant and water of condensation and returning the same to said reservoir, and means for varying the proportion of the lubricant or the water of condensation in said reservoir.

18. In a lubricating system for compressors, a compressor having an inlet, a baffle in said inlet, a lubricant reservoir disposed beneath said baffle, a discharge pipe connected to said compressor, a separator connected to said discharge pipe, a receiver connected to said separator, a trap connected to said separator including a float operated valve, and a connection between said trap and reservoir controlled by said valve.

19. In a lubricating system for compressors, a compressor having an inlet, a baffle in said inlet, a lubricant reservoir disposed beneath said baffle, a discharge pipe connected to said compressor, a separator connected to said discharge pipe, a receiver connected to said separator, a trap connected to said separator including a float operated valve, a connection between said trap and reservoir controlled by said valve, and supplemental means for supplying lubricant to said reservoir.

20. In a lubricating system for compressors, a compressor having an inlet, a baffle in said inlet, a lubricant reservoir disposed beneath said baffle, a discharge pipe connected to said compressor, a separator in said discharge pipe, a receiver connected to said separator, a trap connected to said separator including a float operated valve, a connection between said trap and reservoir controlled by said valve, means for supplying lubricant to said reservoir, and means for varying the level of the lubricant in said reservoir.

In testimony whereof I affix my signature.

WADE H. WINEMAN.